US006391106B2

(12) United States Patent
Moreau et al.

(10) Patent No.: US 6,391,106 B2
(45) Date of Patent: *May 21, 2002

(54) CEMENTITIOUS MIXTURE CONTAINING HIGH POZZOLAN CEMENT REPLACEMENT AND COMPATABILIZING ADMIXTURES THEREFOR

(75) Inventors: John Moreau, Macedonia, OH (US); Runhai Lu, Stow, OH (US); Jeffrey R. Bury, Macedonia, OH (US); Thomas M. Vickers, Jr., Concord Township, OH (US)

(73) Assignee: MBT Holding AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/912,182

(22) Filed: Jul. 24, 2001

Related U.S. Application Data

(63) Continuation of application No. 09/371,627, filed on Aug. 11, 1999, now Pat. No. 6,290,770.
(60) Provisional application No. 60/096,477, filed on Aug. 14, 1998.

(51) Int. Cl.$^7$ ............................................. C04B 24/04
(52) U.S. Cl. ...................... 106/724; 106/725; 106/727; 106/728; 106/823; 524/5
(58) Field of Search ................... 106/724, 725, 106/727, 728, 823; 524/5

(56) References Cited

U.S. PATENT DOCUMENTS

| | | |
|---|---|---|
| 2,790,724 A | 4/1957 | Bergman |
| 4,090,946 A | 5/1978 | Nottes et al. |
| 4,318,744 A | 3/1982 | Dodson |
| 4,337,094 A | 6/1982 | Tokar |
| 4,373,956 A | 2/1983 | Rosskopf |
| 4,460,720 A | 7/1984 | Gaidis et al. |
| 4,471,100 A | 9/1984 | Tsubakimoto et al. |
| 4,519,842 A | 5/1985 | Gerber |
| 4,581,147 A | 4/1986 | Branch, III |
| 4,650,522 A | 3/1987 | Teraji et al. |
| 4,655,942 A | 4/1987 | Dickert, Jr. et al. |
| 4,681,634 A | 7/1987 | Roca et al. |
| 4,686,252 A | 8/1987 | Burge |
| 4,703,087 A | 10/1987 | Lange et al. |
| 4,725,632 A | 2/1988 | Vess |
| 4,741,777 A | 5/1988 | Williams |
| 4,761,183 A | 8/1988 | Clarke |
| 4,777,208 A | 10/1988 | Hefner, Jr. et al. |
| 4,792,343 A | 12/1988 | Hawe et al. |
| 4,797,450 A | 1/1989 | Dehm et al. |
| 4,808,641 A | 2/1989 | Yagi et al. |
| 4,897,119 A | 1/1990 | Clarke |
| 4,946,506 A | 8/1990 | Arfaei |
| 4,968,734 A | 11/1990 | Gaidis et al. |
| 4,972,025 A | 11/1990 | Tsubakimoto et al. |

(List continued on next page.)

FOREIGN PATENT DOCUMENTS

| | | |
|---|---|---|
| EP | 537870 A1 | 4/1993 |
| EP | 725044 A1 | 8/1996 |
| EP | 753488 A2 | 1/1997 |
| EP | 838444 A1 | 4/1998 |
| EP | 850894 A1 | 7/1998 |
| EP | 0930321 A1 | 7/1999 |
| WO | WO97/08217 | 3/1997 |
| WO | WO97/39037 | 10/1997 |

OTHER PUBLICATIONS

JAPIO Publication No. 08–119701. English language abstract for JP 8119701 A. May 14, 1996.
JAPIO Publication No. 08–012398. English language abstract for JP 8012398 A. Jan. 16, 1996.
JAPIO Publication No. 09–278505. English language abstract for JP 9278505 A. Oct. 28, 1997.
JAPIO Publication No. 09–241055. English language abstract for JP 9241055 A. Sep. 16, 1997.
JAPIO Publication No. 09–142906. English language abstract for JP 9142906 A. Jun. 3, 1997.
JAPIO Publication No. 09–142905. English language abstract for JP 9142905 A. Jun. 3, 1997.
JAPIO Publication No. 09–132446. English language abstract for JP 9132446 A. May 20, 1997.
JAPIO Publication No. 09–132445. English language abstract for JP 9132445 A. May 20, 1997.
JAPIO Publication No. 09–110492. English language abstract for JP 9110492 A. Apr. 28, 1997.
JAPIO Publication No. 09–067153. English language abstract for JP 9067153 A. Mar. 11, 1997.

(List continued on next page.)

*Primary Examiner*—Paul Marcantoni
(74) *Attorney, Agent, or Firm*—Renner, Kenner, Greive, Bobak, Taylor & Weber

(57) ABSTRACT

A cementitious mixture comprises a hydraulic cement; greater than about 10% by weight of a pozzolanic cement replacement selected from fly ash, slag, natural pozzolans, and mixtures thereof, based on the weight of said hydraulic cement and cement replacement; and a compatabilizing admixture, wherein the compatabilizing admixture comprises a compatabilizing derivatized polycarboxylate polymer dispersant capable of acting as a water reducer, in combination with an accelerator. The derivatized polycarboxylate dispersant, alone or in combination with other derivatized polycarboxylate dispersants, is a polymer comprising units derived from at least one of a substituted carboxylic acid monomer and a substituted ethylenically unsaturated monomer, at least one of an N-polyoxyalkylene maleimide and a condensation product of an unsubstituted carboxylic acid monomer and an alkoxypolyoxyalkylene primary amine substituted carboxylic acid monomer, and optionally including an unsaturated hydrocarbon. The derivatized polycarboxylate dispersant provides for a longer shelf life dispersant, improved dispersability of cementitious mixtures, water reduction in cementitious mixtures, and is an effective dispersant in high pozzolan replaced cementitious mixtures.

18 Claims, No Drawings

U.S. PATENT DOCUMENTS

| | | | |
|---|---|---|---|
| 5,085,708 A | 2/1992 | Moriya et al. | |
| 5,100,984 A | 3/1992 | Burge et al. | |
| 5,106,423 A | 4/1992 | Clarke | |
| 5,134,187 A | 7/1992 | Aihara | |
| 5,158,996 A | 10/1992 | Valenti | |
| 5,211,751 A | 5/1993 | Arfaei | |
| 5,223,036 A | 6/1993 | Koyata et al. | |
| 5,348,583 A | 9/1994 | Arfaei | |
| 5,348,993 A | 9/1994 | Daeumer et al. | |
| 5,358,566 A | 10/1994 | Tanaka et al. | |
| 5,369,198 A | 11/1994 | Albrecht et al. | |
| 5,393,343 A | 2/1995 | Darwin et al. | |
| 5,424,445 A | 6/1995 | Hendrick ter Maat et al. | |
| RE35,194 E | 4/1996 | Gerber | |
| 5,556,458 A | 9/1996 | Brook | |
| 5,576,378 A | 11/1996 | Kuhlmann et al. | |
| 5,583,183 A | 12/1996 | Darwin et al. | |
| 5,604,273 A | 2/1997 | Kerkar et al. | |
| 5,605,571 A | 2/1997 | Buerge | |
| 5,609,681 A | 3/1997 | Drs et al. | |
| 5,614,017 A | 3/1997 | Shawl | |
| 5,633,298 A | 5/1997 | Arfaei et al. | |
| 5,633,310 A | 5/1997 | Sulser et al. | |
| 5,643,978 A | 7/1997 | Darwin et al. | |
| 5,661,206 A | 8/1997 | Tanaka et al. | |
| 5,665,158 A | 9/1997 | Darwin et al. | |
| 5,665,842 A | 9/1997 | Leikauf | |
| 5,668,195 A | 9/1997 | Leikauf | |
| 5,670,578 A | 9/1997 | Shawl | |
| 5,674,316 A | 10/1997 | Izumi et al. | |
| 5,703,174 A | 12/1997 | Arfaei et al. | |
| 5,707,445 A | 1/1998 | Yamato et al. | |
| 5,725,657 A | 3/1998 | Darwin et al. | |
| 5,726,267 A | 3/1998 | Howland et al. | |
| 5,728,207 A | 3/1998 | Arfaei et al. | |
| 5,739,212 A | 4/1998 | Wutz et al. | |
| 5,753,744 A | 5/1998 | Darwin et al. | |
| 5,786,436 A | 7/1998 | Fischer et al. | |
| 5,798,425 A | 8/1998 | Albrecht et al. | |
| 5,840,114 A | 11/1998 | Jeknavorian et al. | |
| 5,912,284 A | 6/1999 | Hirata et al. | |
| 5,925,184 A | 7/1999 | Hirata et al. | |
| 6,008,275 A * | 12/1999 | Moreau et al. | 524/5 |
| 6,290,770 B1 * | 9/2001 | Moreau et al. | 106/708 |

OTHER PUBLICATIONS

JAPIO Publication No. 09–012351. English language abstract for JP 9012351 A. Jan. 14, 1997.
JAPIO Publication No. 08–295547. English language abstract for JP 8295547 A. Nov. 12, 1996.
JAPIO Publication No. 08–268741. English language abstract for JP 8268741 A. Oct. 15, 1996.
JAPIO Publication No. 08–165156. English language abstract for JP 8165156 A. Jun. 25, 1996.
JAPIO Publication No. 08–059323. English language abstract for JP 8059323 A. Mar. 5, 1996.
JAPIO Publication No. 08–048852. English language abstract for JP 8048852 A. Feb. 20, 1996.
JAPIO Publication No. 08–034652. English language abstract for JP 8034652 A. Feb. 6, 1996.
JAPIO Publication No. 08–012401. English language abstract for JP 8012401 A. Jan. 16, 1996.
JAPIO Publication No. 07–247150. English language abstract for JP 7247150 A. Sep. 26, 1995.
JAPIO Publication No. 07–247149. English language abstract for JP 7247149 A. Sep. 26, 1995.
JAPIO Publication No. 07–247148. English language abstract for JP 7247148 A. Sep. 26, 1995.
JAPIO Publication No. 07–126053. English language abstract for JP 7126053 A. May 16, 1995.
JAPIO Publication No. 07–053249. English language abstract for JP 7053249 A. Feb. 28, 1995.
JAPIO Publication No. 07–025651. English language abstract for JP 7025651 A. Jan. 27, 1995.
JAPIO Publication No. 07–025650. English language abstract for JP 7025650 A. Jan. 27, 1995.
JAPIO Publication No. 06–321596. English abstract for JP 6321596 A. Nov. 22, 1994.
JAPIO Publication No. 06–298557. English language abstract for JP 6298557 A. Oct. 25, 1995.
JAPIO Publication No. 06–279082. English language abstract for JP 6279082 A. Oct. 4, 1994.
JAPIO Publication No. 06–256054. English language abstract for JP 6256054 A. Sep. 13, 1994.
JAPIO Publication No. 06–183803. English language abstract for JP 6183803 A. Jul. 5, 1994.
JAPIO Publication No. 06–157100. English language abstract for JP 6157100 A. Jun. 3, 1994.
JAPIO Publication No. 06–107446. English language abstract for JP 6107446 A. Apr. 19, 1994.
JAPIO Publication No. 06–064956. English language abstract for JP 6064956 A. Mar. 8, 1994.
JAPIO Publication No. 05–246743. English language abstract for JP 5246743 A. Sep. 24, 1993.
JAPIO Publication No. 05–170501. English language abstract for JP 5170501 A. Jul. 9, 1993.
JAPIO Publication No. 04–175254. English language abstract for JP 4175254 A. Jun. 23, 1992.
JAPIO Publication No. 04–175253. English language abstract for JP 4175253 A. Jun. 23, 1992.
JAPIO Publication No. 04–119956. English language abstract for JP 4119956 A. Apr. 21, 1992.
JAPIO Publication No. 04–119955. English language abstract for JP 4119955 A. Apr. 21, 1992.
JAPIO Publication No. 03–218956. English language abstract for JP 3218956 A. Sep. 26, 1991.
JAPIO Publication No. 02–281014. English language abstract for JP 2281014 A. Nov. 16, 1990.
JAPIO Publication No. 01–188449. English language abstract for JP 1188449 A. Jul. 27, 1989.
JAPIO Publication No. 63–285142. English language abstract for JP 63285142 A. Nov. 22, 1998.
Patent Abstracts of Japan, Publication No. 07267705, Applicant: Fujisawa Pharmaceut Co. Ltd., Publication Date: Oct. 17, 1995.

* cited by examiner

CEMENTITIOUS MIXTURE CONTAINING HIGH POZZOLAN CEMENT REPLACEMENT AND COMPATABILIZING ADMIXTURES THEREFOR

CROSS REFERENCE TO RELATED APPLICATIONS

This application is a Continuation of U.S. Ser. No. 09/371,627 filed Aug. 11, 1999, now U.S. Pat. No. 6,290,770, which claims priority from U.S. Provisional Patent Application 60/096,477 filed on Aug. 14, 1998.

FIELD OF THE INVENTION

The present invention is directed to cementitious mixtures containing pozzolanic cement replacement materials. More particularly, the present invention is directed to cementitious mixtures containing high percentages of pozzolan cement replacement, and compatabilizing admixtures therefor.

BACKGROUND OF THE INVENTION

Over the years, the use of cementitious materials as a partial replacement for portland cement in concrete has become an increasingly attractive alternative to portland cement alone. The desire to increase the use of fly ash, blast furnace slag, and natural pozzolanic cement in concrete mixtures can be attributed to several factors. These include cement shortages, economic advantages of portland cement replacement, improvements in permeability of the concrete product, and lower heats of hydration.

The growth in the use of higher amounts of pozzolanic cement replacements, such as fly ash for example, in concrete has been impaired by the potential incompatibility exhibited by these materials, especially when used at high percentages, in combination with water reducing admixtures. Water reducers are desirable to decrease the amount of water required in the preparation of the cementitious mixtures, and to increase the strength of the resulting concrete. However, the incompatibility of the pozzolan replacement materials with water reducing admixtures can result in the significant retardation of the initial and final setting of the concrete containing both these materials.

Despite the cost and performance advantages of fly ash, slag, calcined clay, and natural pozzolans as partial replacements of portland cement in concrete, there are practical limitations to the amount at which they can be used in the cementitious mixture. Using these materials at higher levels, such as above about 10 to 15 weight percent based on the weight of the portland cement, can result in the retarded setting time of the concrete up to several hours, and perhaps longer depending upon the ambient temperature. This incompatibility puts a burden of increased costs and time on the end user which is unacceptable.

While it is known to use set time accelerators in concrete mixtures, these accelerator admixtures have been ineffective in solving the compatibility problem that exists in high pozzolan replacement/portland cement mixtures, particularly when used with water reducing admixtures, so that set time is not able to be decreased to an acceptable level. The use of accelerators with water reducers, such as naphthalene sulfonates, lignin and substituted lignins, melamine and the like, has been ineffective to produce an acceptable high pozzolanic replacement containing hydraulic cement based cementitious mixture with normal setting characteristics and an acceptable resulting concrete.

U.S. Pat. Nos. 4,373,956 and 4,473,405 disclose various admixture compositions for incorporation into hydraulic cement mixes to accelerate the rate of hardening and setting. U.S. Pat. No. 4,337,094 discloses combinations of additives which can be used to accelerate the setting time of portland type cements. These additives, when used in cementitious mixtures containing portland cement and high proportions of pozzolan cement replacements, as well as a water reducer, cannot compensate for the retardation of setting time induced in the mixtures by the cement replacement and water reducer, and thus do not acceptably accelerate the mixture to setting.

U.S. Pat. No. 5,556,458 discloses a cementitious composition containing a high percentage of fly ash and hydraulic cement, but in which a fly ash containing a particular calcium oxide content is required and a water reducing admixture is not present. The composition is useful for quick setting repair mortar type products.

What is required by the industry, however, is a cementitious mixture capable of forming concrete which contains a significant percentage of cement replacement material (to replace a portion of the hydraulic cement, such as portland cement) for performance and cost considerations, and water reducers to decrease water usage and increase compressive strength, the components in such cementitious mixtures being compatible and which mixtures set in an industry-acceptable time period.

U.S. Pat. No. 5,158,996 and patent publication EP753488, both of which are hereby incorporated by reference herein, disclose polymer additives useful as additives, such as dispersants, for cement mixtures, but their use with high pozzolan replacement/portland cement mixtures has not previously been considered.

It is therefore an object of the invention to provide a cementitious mixture which contains a significant proportion of pozzolan cement replacement materials for hydraulic cement, such as portland cement, as well as water reducing materials, which have acceptable or improved compressive strength.

It is another object of the invention to provide a cementitious mixture which contains a significant proportion of pozzolan cement replacement materials for hydraulic cement, such as portland cement, as well as water reducing materials, which set in an industry-acceptable time period.

It is another object of the invention to provide a method for preparing a cementitious material which contains a significant proportion of pozzolan cement replacement materials for hydraulic cement, such as portland cement, as well as water reducing materials, which have acceptable or improved compressive strength and which set in an industry-acceptable time period.

It is another object of the invention to provide a compatabilizing admixture for cementitious mixtures which contain a significant proportion of pozzolan cement replacement materials for hydraulic cement, such as portland cement, which admixtures provide water reducing means for imparting acceptable or improved compressive strength, and set accelerating means for inducing the mixture to set in an industry-acceptable time period.

SUMMARY OF THE INVENTION

The present invention is directed to a compatabilizing admixture for cementitious mixtures containing hydraulic cement and greater than about 10 percent pozzolanic cement replacement by weight of the portland cement and cement replacement, comprising a derivatized polycarboxylate dispersant which is a polymer comprising units derived from at least one of a substituted carboxylic acid monomer and a substituted ethylenically unsaturated monomer, at least one of an N-polyoxyalkylene maleimide and a condensation product of an unsubstituted carboxylic acid monomer and an alkoxypolyoxyalkylene primary amine substituted carboxylic acid monomer, and optionally including an unsaturated hydrocarbon, in combination with a set accelerator for concrete. The derivatized polycarboxylate dispersant preferably has the general structure shown below:

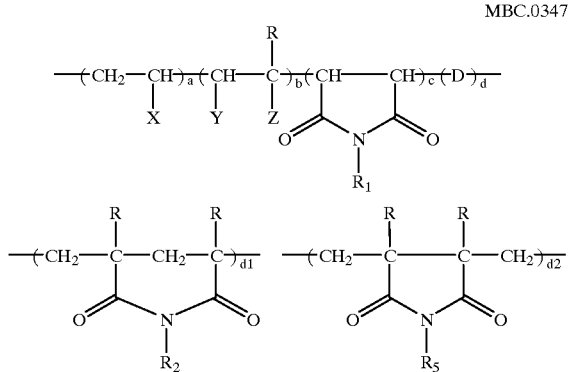

MBC.0347 where:
D=a component selected from the group consisting of the structure d1, the structure d2, and mixtures thereof;
X=H, $CH_3$, $C_2$ to $C_6$ Alkyl, Phenyl, Substituted Phenyl such as p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Amnmonia, Amine, Substituted Amine such as triethanol amine, Methyl, $C_2$ to about $C_6$ Alkyl;
a=0 to about 0.8, preferably 0 to about 0.6, and most preferably 0 to about 0.5;
b=About 0.2 to about 0.99, preferably about 0.3 to about 0.99, and most preferably about 0.4 to about 0.99;
c=0 to about 0.5, preferably 0 to about 0.3, and most preferably 0 to about 0.1;
d=0 to about 0.5, preferably 0 to about 0.3, and most preferably 0 to about 0.1;
and
wherein a, b, c, and d represent the mole fraction of each unit and the sum of a, b, c, and d is 1.0, and wherein at least one of c and d is greater than 0.

The pozzolan cement replacement for a portion of the portland cement, according to the present invention, includes at least one of fly ash (such as Class C fly ash and Class F fly ash), blast furnace slag, calcined clay, and natural pozzolanic materials. "Natural pozzolans" is a term of art used in the cementitious formulation industry and is well known to those of ordinary skill in the art to mean those pozzolans that are naturally occurring as opposed to blast furnace slag or fly ash, which are produced by man-made processes. Naturally occurring pozzolans include volcanic tuffs and pumices, trasses, diatomaceous earths, opaline cherts, and some shales. Preferably, up to 50 percent of the portland cement in the cementitious product is replaced by the pozzolanic cement replacement material.

The present invention further provides a method for preparing a cementitious material comprising mixing a hydraulic cement with a pozzolanic cement replacement selected from fly ash, slag, natural pozzolans, and mixtures thereof, and a compatabilizing admixture, wherein the compatabilizing admixture comprises the above described derivatized polycarboxylate water reducing dispersant, in combination with an accelerator for concrete. In one embodiment, the method uses a compatabilizing admixture which comprises a derivatized polycarboxylate dispersant comprising a polymer of the general structure shown below:

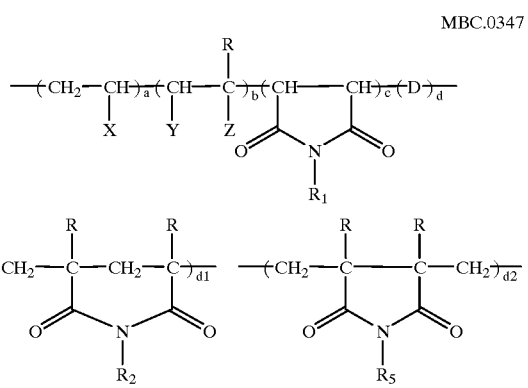

MBC.0347 where:
D=a component selected from the group consisting of the structure d1, the structure d2, and mixtures thereof;
X=H, $CH_3$, $C_2$ to $C_6$ Alkyl, Phenyl, Substituted Phenyl such as p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonia, Amine, Substituted Amine such as triethanol amine, Methyl, $C_2$ to about $C_6$ Alkyl;
a=0 to about 0.8, preferably 0 to about 0.6, and most preferably 0 to about 0.5;
b=About 0.2 to about 0.99, preferably about 0.3 to about 0.99, and most preferably about 0.4 to about 0.99;
c=0 to about 0.5, preferably 0 to about 0.3, and most preferably 0 to about 0.1;
d=0 to about 0.5, preferably 0 to about 0.3, and most preferably 0 to about 0.1;
and
wherein a, b, c, and d represent the mole fraction of each unit and the sum of a, b, c, and d is 1.0, and wherein at least one of c and d is greater than 0.

The present invention further comprises a compatabilizing admixture for cementitious mixtures containing hydraulic cement and greater than about 10 percent pozzolanic cement replacement based on total weight of the cement and cement replacement, comprising the above described derivatized polycarboxylate water reducing dispersant, in combination with an accelerator for concrete. In one embodiment, the compatabilizing admixture comprises a derivatized polycarboxylate dispersant comprising a polymer of the general structure shown below:

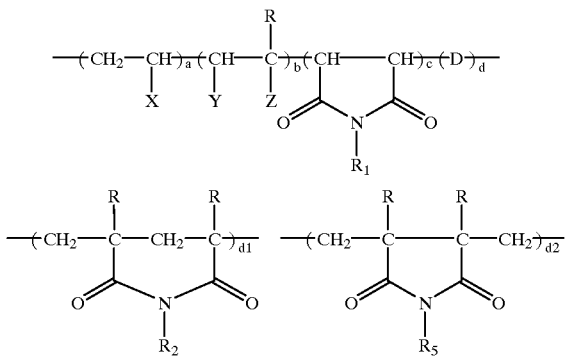

where:
D=a component selected from the group consisting of the structure d1, the structure d2, and mixtures thereof;
X=H, $CH_3$, $C_2$ to $C_6$ Alkyl, Phenyl, Substituted Phenyl such as p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonia, Amine, Substituted Amine such as triethanol amine, Methyl, $C_2$ to about $C_6$ Alkyl;
a=0 to about 0.8, preferably 0 to about 0.6, and most preferably 0 to about 0.5;
b=About 0.2 to about 0.99, preferably about 0.3 to about 0.99, and most preferably about 0.4 to about 0.99;
c=0 to about 0.5, preferably 0 to about 0.3, and most preferably 0 to about 0.1;
d=0 to about 0.5, preferably 0 to about 0.3, and most preferably 0 to about 0.1;
and
wherein a, b, c, and d represent the mole fraction of each unit and the sum of a, b, c, and d is 1.0, and wherein at least one of c and d is greater than 0.

DETAILED DESCRIPTION OF THE INVENTION

The present invention is directed to a compatabilizing admixture for cementitious mixtures containing hydraulic portland cement and greater than about 10 percent pozzolanic cement replacement by weight of the portland cement and cement replacement, comprising a derivatized polycarboxylate dispersant which is a polymer comprising units derived from at least one of a substituted carboxylic acid monomer and a substituted ethylenically unsaturated monomer, at least one of an N-polyoxyalkylene maleimide and a condensation product of an unsubstituted carboxylic acid monomer and an alkoxypolyoxyalkylene primary amine substituted carboxylic acid monomer, and optionally including an unsaturated hydrocarbon, in combination with a set accelerator for concrete. The derivatized polycarboxylate

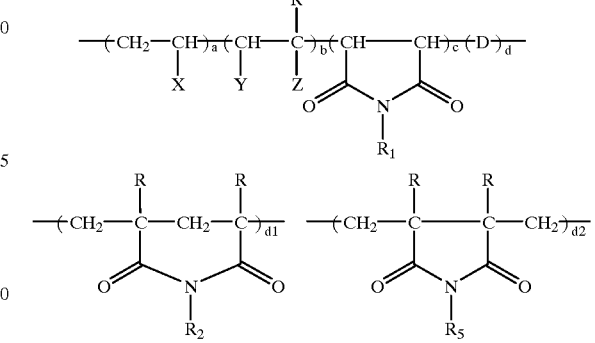

dispersant preferably has the general structure shown below:
where:
D=a component selected from the group consisting of the structure d1, the structure d2, and mixtures thereof;
X=H, $CH_3$, $C_2$ to $C_6$ Alkyl, Phenyl, Substituted Phenyl such as p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonia, Amine, Substituted Amine such as triethanol amine, Methyl, $C_2$ to about $C_6$ Alkyl;
a=0 to about 0.8, preferably 0 to about 0.6, and most preferably 0 to about 0.5;
b=About 0.2 to about 0.99, preferably about 0.3 to about 0.99, and most preferably about 0.4 to about 0.99;
c=0 to about 0.5, preferably 0 to about 0.3, and most preferably 0 to about 0.1;
d=0 to about 0.5, preferably 0 to about 0.3, and most preferably 0 to about 0.1;
and
wherein a, b, c, and d represent the mole fraction of each unit and the sum of a, b, c, and d is 1.0, and wherein at least one of c and d is greater than 0.

Representative monomers for use in this invention for the "a" component include, but are not limited to, styrene, ethylene, propylene, or sulfonated styrene. Representative monomers for use in this invention for the "b" component include, but are not limited to, acrylic acid, methacrylic acid, about $C_1$ to about $C_6$ alkyl esters of acrylic acid, about $C_1$ to about $C_6$ alkyl esters of methacrylic acid, alkoxypolyoxyalkylene esters of acrylic acid, aryloxypolyoxyalkylene esters of acrylic acid, alkoxypolyoxyalkylene esters of methacrylic acid, aryloxypolyoxyalkylene esters of methacrylic acid, maleic acid, vinyl sulfonic acid, methoxypolyoxyalkylene vinyl ether, methoxypolyoxyalkylene allyl ether, alkoxypolyoxyalkylene vinyl ether, aryloxypolyoxyalkylene vinyl ether, alkoxypolyoxyalkylene allyl ether, or aryloxypolyoxyalkylene allyl ether. The alkoxy and aryloxy polyoxyalkylene moieties of the above monomers are random copolymers of oxyethylene units and oxypropylene units wherein the amount of oxyethylene in the random copolymer is from about 60% to 100% and the amount of oxypropylene in the random copolymer is from 0% to about 40%. Preferably, the number average molecular weight if from about 200 to about 5,000 with a carbon chain size of about $C_5$ to about $C_{15}$.

Components "c" and "d" can be formed from a second reaction from the grafting of the side chains onto the polymer backbone such as a polyacrylate or maleic polymer. The reaction to form component "c" and/or "d" is related to the temperature of the grafting reaction. If the temperature is high enough, the succinimide components "c" and "d" are formed. Component "c" is formed from a single monomer which is a component "b" with Y as COOH and Z as $CONHR_3$. A condensation reaction occurs wherein water condenses and the ring closes to form component "c".

Component "d" is formed by a condensation involving two monomers such as acrylic acid (component "b" with Y as COOH and Z as H) and an acrylic acid derivatized with an alkoxypolyoxyalkylene primary amine, that is a component "b" with Y as H and Z as $CONHR_3$. A condensation reaction occurs wherein water condenses and the ring closes to form component "d1" or "d2". Component "d2" is formed by a head to head reaction of the two monomers. Component "d1" is formed by a head to tail reaction of the two monomers.

The optional alkali metal (M) component in the dispersant of the present invention is preferably lithium, sodium, or potassium. The optional alkaline earth metal (also M) component in the dispersant of the present invention is preferably magnesium or calcium.

We have found that the incorporation of amide or imide linkages between the copolymer, such as styrene-maleic main chain polymer, and the alkoxy polyoxyalkylene side chain can improve the chemical and performance stability of graft polymer solutions. Incorporation of nitrogen based linkages between main chain and side chain stabilizes side chain degrafting that slowly occurs with maleic mono ester linkages during solution storage, thus increasing the shelf life of the polycarboxylate dispersant. Improved solution stability leads to better long term performance behavior from aged polymer solutions, better dispersability of cement from aged solutions, and better maintenance of cement in a dispersed state.

In one embodiment, the present invention is an additive formulation, or an admixture, for incorporation in hydraulic cement mixtures, such as concretes, mortars and grouts, containing portland cement and pozzolanic cement replacement. By "portland cement" is meant all cementitious compositions which have a high content of tricalcium silicate, and thus includes portland cement and those cements which are chemically similar or analogous to portland type cement, the specification for which is set forth in ASTM specification C-150-80.

Pozzolanic replacement materials for hydraulic, or portland-type, cement which can be used in high proportion according to the present invention include fly ash (either or both Class C and Class F), blast furnace slag, calcined clay, and natural pozzolan materials. These replacement materials can be used in a proportion, based on the weight of the hydraulic cement and the cement replacement, of greater than 10 weight percent, preferably greater than 15 weight percent, and most preferably greater than 20 weight percent. It is most preferred, however, that the cementitious mix contain at least 50 weight percent portland cement, based upon the total weight of portland cement and pozzolanic replacement material, combined.

As discussed above, the addition of high proportions of the pozzolanic material to the cementitious mixture in combination with a conventional water reducing admixture (which water reducer increases compressive strength), results in a significant retarding of the setting time for the cementitious mixture.

The present invention provides a novel compatabilizing admixture for the high pozzolanic replacement material containing hydraulic cement, as well as a novel cementitious mixture containing the pozzolanic replacement and the compatabilizing admixture, and a method for preparing the cementitious mixture. The compatabilizing admixture of the present invention significantly reduces, and in many instances eliminates the retardation of concrete containing high proportions of pozzolanic replacement materials for the hydraulic, or portland type, cement.

The present invention includes a cementitious mixture comprising a hydraulic cement; greater than about 10% by weight of a pozzolanic cement replacement selected from fly ash, slag, natural pozzolans, and mixtures thereof based on the total of said hydraulic cement and cement replacement; and a compatabilizing admixture, wherein the compatabilizing admixture comprises the derivatized polycarboxylate water reducing dispersant, described above, in combination with an accelerator for concrete.

The preferred amount of pozzolanic cement replacement material will be at least 10% by weight, but more preferably, will be greater than about 15% by weight based on the total weight of hydraulic cement and cement replacement material if fly ash (such as Class C fly ash and Class F fly ash) or calcined clay is utilized as said cement replacement material; at least about 25% by weight based on the total weight of hydraulic cement and cement replacement material when slag is utilized as said cement replacement material; and at least about 24% by weight based on the total weight of hydraulic cement and cement replacement material when natural pozzolans are utilized as said cement replacement material.

While the use of the derivatized polycarboxylate polymer dispersants with conventional accelerators, including calcium chloride, is effective to overcome the set time retarding effects of the high pozzolan content cementitious mixture, the present invention is particularly effective in avoiding the use of chloride containing accelerators, and thus avoids corrosion problems often associated with them.

Preferably, the accelerator according to the present invention comprises at least one of a) a nitrate salt of an alkali metal, alkaline earth metal, or aluminum;, b) a nitrite salt of an alkali metal, alkaline earth metal, or aluminum;

c) a thiocyanate of an alkali metal, alkaline earth metal, or aluminum;

d) an alkanolamine;

e) a thiosulfate of an alkali metal, alkaline earth metal, or aluminum;

f) a hydroxide of an alkali metal, alkaline earth metal, or aluminum;

g) a carboxylic acid salt of an alkali metal, alkaline earth metal, or aluminum;

h) a polyhydroxylalkylamine; or, i) a halide salt of an alkali metal or alkaline earth metal.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal, or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_dCH_2OH]_e$, where c is 3-e, d is 1 to about 5 and e is 1 to about 3. Examples include, but are not limited to, monoethanolamine, diethanolamine and triethanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements as discussed above. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylalkylamine has the general formula

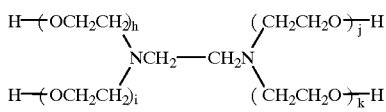

wherein h is 1 to 3, i is 1 to 3, j is 1 to 3, and k is 0 to 3. Preferred is tetrahydroxyethylethylenediamine.

A conventional chloride-containing accelerator may be used in combination with the polycarboxylate dispersant to form a compatabilizing admixture according to the present invention, for product applications in which corrosion of reinforcing steel is not an issue, for example, in concrete block production.

The halide salt of an alkali metal or alkaline earth metal has the general formula $M(Halide)_a$ where M is an alkali metal or an alkaline earth metal, and where a is 1 for alkali metal salts and 2 for alkaline earth salts. Preferred metals are Na, K, Mg, and Ca. Preferred halides are F, Cl, Br, and I.

The cementitious mixture additionally may contain water in an amount sufficient to effect hydraulic setting of the cement and aggregate mixture. The cementitious mixture may also contain an additional material such as silica fume or metakaolin. The term aggregate includes both fine aggregate such as sand and coarse aggregate such as gravel, as is common in the art. The proportion of fine and coarse aggregate will vary depending on the desired properties of the mortar or concrete. The amount of water generally should be enough to effect hydraulic setting of the cement component and to provide a desired degree of workability to the mix before hardening.

In the practice of the present invention, the compatabilizing admixture components described above are incorporated into hydraulic cement mixes in amounts sufficient to compatabilize the pozzolanic replacement material and the hydraulic cement, to accelerate the rate of hardening and setting of the mixes and to reduce water to increase compressive strength after hardening, thereby enhancing overall durability of the product. The admixture is preferably incorporated into the mix as an aqueous solution comprising a portion of the water used in mixing the hydraulic cement, pozzolanic replacement material, aggregate, and any additional additives. The amount of the derivatized polycarboxylate dispersant and accelerator in the compatabilizing admixture is generally present in an amount of about 0.09 to about 2 parts per 100 parts by weight of hydraulic cement and cement replacement. Representative admixture formulations are set forth in Table 1A, below. (Percentages are by weight.)

TABLE 1A

| Component | Percentage | Preferred |
|---|---|---|
| Nitrate salt | 0–60 | 20–40 |
| Nitrite salt | 0–60 | 20–40 |
| Thiocyanate | 0–10 | 1–4 |
| Alkanolamine | 0–10 | 0–1 |
| Polyhydroxylalkylamine | 0–5 | 0–4 |
| Polymer | 1–20 | 3–8 |
| Thiosulfate | 0–10 | |
| Carboxylic acid salt | 0–20 | |
| Hydroxide | 0–10 | |

The remainder of the admixture solution comprises water. By way of example, but not of limitation, the amount of active admixture material delivered per 100 pounds of cementitious material (cement+cement replacement) in aqueous solution is preferably calculated as follows in Table 1B.

TABLE 1B

| Admixture Solution | | Active Components (pounds) |
|---|---|---|
| (Fl. oz.) | (ml/100 kg) | (% by wt. cementitious material) |
| 2.5 | 160 | 0.09 |
| 5 | 320 | 0.18 |
| 10 | 650 | 0.36 |
| 20 | 1300 | 0.72 |
| 30 | 1960 | 1.08 |
| 40 | 2600 | 1.44 |
| 50 | 3260 | 1.80 |

It will be obvious to those of average skill in the art that the cementitious mixture described herein may contain other additives or ingredients, and should not be limited to the above formulation. Cement additives that can be added include, but are not limited to, air entraining agents, air detraining agents, foaming agents, defoaming agents, corrosion inhibitors, shrinkage reducing agents, pigments, and mixtures thereof.

The present invention achieves the objects of the invention. A cementitious mixture is provided which contains a significant proportion of pozzolan cement replacement materials for hydraulic cement, such as portland cement, as well as water reducing materials, which have acceptable or improved compressive strength, and which set in an industry-acceptable time period. A method is provided for preparing a cementitious material which contains a significant proportion of pozzolan cement replacement materials for hydraulic cement, such as portland cement, as well as water reducing materials, which have acceptable or improved compressive strength and which set in an industry-acceptable time period. The objects are achieved through the inventive compatabilizing admixture for cementitious mixtures which contain a significant proportion of pozzolan cement replacement.

The compatabilizing admixture acts as a mid-range water reducer (permitting a reduction of mix water of from about 5% to about 15%. Compressive strength and durability of the resulting product are improved. Significant replacement of hydraulic cement by pozzolanic materials is achieved, with setting times for the cementitious mixture containing the replacement, such as both Class C and Class F fly ash, equivalent to or less than set times for conventional mixtures without the replacement materials. Set times of the inventive cementitious mixtures are significantly accelerated over untreated concrete containing high amounts of fly ash, blast furnace slag or pozzolanic cement.

It should be appreciated that the present invention is not limited to the specific embodiments described above, but includes variations, modifications and equivalent embodiments defined by the following claims.

What is claimed is:

1. A compatabilizing admixture for cementitious mixtures containing hydraulic portland cement and greater than about 10 percent pozzolanic cement replacement by weight of the portland cement and cement replacement; comprising a derivatized polycarboxylate dispersant which is a polymer comprising units derived from:

A) at least one of:
   i) a substituted carboxylic acid monomer; and
   ii) a substituted ethylenically unsaturated monomer;
B) at least one of;
   i) a N-polyoxyalkylene maleimide; and
   ii) a condensation product of an unsubstituted carboxylic acid monomer and an alkoxypolyoxyalkylene primary amine substituted carboxylic acid monomer; and
C) optionally including an unsaturated hydrocarbon, in combination with an accelerator for concrete; and wherein the derivatized polycarboxylate disperant comprises a polymer represented by a general structure of Formula I:

(Formula I)

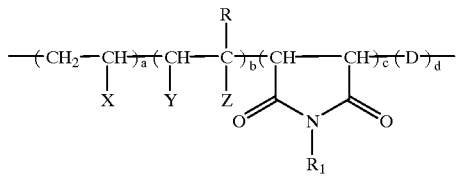

Structure d1

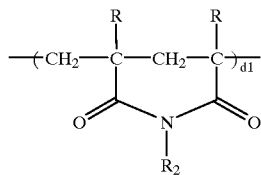

Structure d2

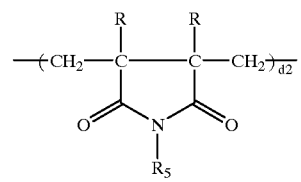

wherein:
D=a component selected from the group consisting of the structure d1, the structure d2, and mixtures thereof;
X=H, $CH_3$, $C_2$ to $C_6$ Alkyl, Phenyl, Substituted Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1, R_2, R_3, R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to $C_6$ Alkyl, $C_6$ to $C_{10}$ aryl;
M=H, Alkali Metal, Alkaline Earth Metal, Ammonia, Amine, Substituted Amine, Methyl, $C_2$ to $C_6$ Alkyl;
a=0 to about 0.8;
b=about 0.2 to about 0.99;
c=0 to about 0.5;
d=0 to about 0.5; and
wherein a, b, c, and d represent the mole fraction of each unit and the sum of a, b, c, and d is 1.0, and wherein at least one of c and d is greater than 0.

2. The admixture of claim 1, wherein the compatabilizing admixture is chloride free.

3. The admixture of claim 1, wherein the accelerator comprises at least one of
   a. a nitrate salt of an alkali metal, alkaline earth metal, or aluminum;
   b. a nitrite salt of an alkali metal, alkaline earth metal, or aluminum;
   c. a thiocyanate of an alkali metal, alkaline earth metal, or aluminum;
   d. an alkanolamine;
   e. a thiosulphate of an alkali metal, alkaline earth metal, or aluminum;
   f. a hydroxide of an alkali metal, alkaline earth metal, or aluminum;
   g. a carboxylic acid salt of an alkali metal, alkaline earth metal, or aluminum;
   h. a polyhydroxylalkylamine; or,
   i. a halide salt of an alkali metal or alkaline earth metal.

4. The admixture of claim 1, wherein a is from 0 to about 0.6.

5. The admixture of claim 4, wherein a is from 0 to about 0.5.

6. The admixture of claim 1, wherein b is from about 0.3 to about 0.99.

7. The admixture of claim 6, wherein b is from about 0.4 to about 0.99.

8. The admixture of claim 1, wherein c is from 0 to about 0.3.

9. The admixture of claim 8, wherein c is from 0 to about 0.1.

10. The admixture of claim 1, wherein d is from 0 to about 0.3.

11. The admixture of claim 10, wherein d is from 0 to about 0.1.

12. The admixture of claim 1, wherein at least one of the following is present:
  i) M comprises triethanol amine; and
  ii) X comprises p-Methyl Phenyl.

13. A cementitious mixture comprising hydraulic cement; greater than about 10% by weight of a pozzolanic cement replacement selected from the group consisting of fly ash, slag, natural pozzolans, and mixtures thereof based on the weight of said hydraulic cement and cement replacement; and a compatabilizing admixture comprising a derivatized polycarboxylate dispersant and an accelerator for concrete; and optionally including at least one of aggregate, silica fume, and metakaolin, wherein the derivatized polycarboxylate dispersant and the accelerator for concrete are both present in amounts effective in compatabilitizing the pozzolanic cement replacement and the hydraulic cement and in accelerating the rate of hardening and setting; wherein the derivatized polycarbolxylate dispersant comprises:

A) at least one of:
  i) a substituted carboxylic acid monomer; and
  ii) a substituted ethylenically unsaturated monomer;

B) at least one of:
  i) an N-polyoxyalkylene maleimide; and
  ii) a condensation product of an unsubstituted carboxylic acid monomer and an alkoxypolyoxyalkylene primary amine substituted carboxylic acid monomer; and C) optionally including an unsaturated hydrocarbon; and wherein the derivatized polycarboxylate dispersant comprises a polymer represented by a general structure of Formula I:

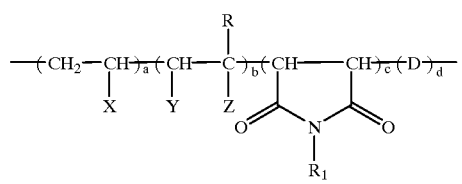

(Formula I)

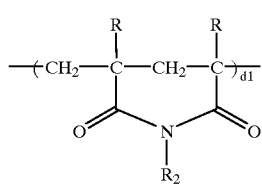

Structure d1

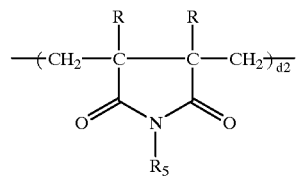

Structure d2 wherein:
  D=a component selected from the group consisting of the structure d1, the structure d2, and mixtures thereof;
  X=H, $CH_3$, $C_2$ to $C_6$ Alkyl, Phenyl, Substituted Phenyl, Sulfonated Phenyl;
  Y=H, —COOM;
  R=H, $CH_3$;
  Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
  $R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
  $R_4$=H, Methyl, $C_2$ to $C_6$ Alkyl, $C_6$ to $C_{10}$ aryl;
  M=H, Alkali Metal, Alkaline Earth Metal, Ammonia, Amine, Substituted Amine, Methyl, $C_2$ to $C_6$ Alkyl;
  a=0 to about 0.8;
  b=about 0.2 to about 0.99;
  c=0 to about 0.5;
  d=0 to about 0.5; and
  wherein a, b, c, and d represent the mole fraction of each unit and the sum of a, b, c, and d is 1.0, and wherein at least one of c and d is greater than 0; and
  wherein at least one of the following is present:
    i) M comprises triethanol amine; and
    ii) X comprises p-Methyl Phenyl.

14. The cementitious mixture of claim 13, wherein the general structure of Formula I is further characterized by at least one of: i) a is from 0 to about 0.6; ii) b is from 0.3 to about 0.99; iii) c is from 0 to about 0.3; and iv) d is from 0 to about 0.3.

15. The cementitious mixture of claim 13, wherein the general structure of Formula I is further characterized by at least one of: i) a is from 0 to about 0.5; ii) b is from 0.3 to about 0.99; iii) c is from 0 to about 0.1; and iv) d is from 0 to about 0.1.

16. A method of preparing a cementitious material comprising mixing a hydraulic cement with a pozzolanic cement replacement selected from the group consisting of fly ash, slag, calcined clay, natural pozzolans, and mixtures thereof; and a compatabilizing admixture comprising a derivatized polycarboxylate dispersant and an accelerator for concrete; optionally including mixing aggregate with the cement and cement replacement, and including additionally mixing water in an amount sufficient to effect hydraulic setting of the cement, cement replacement and optional aggregate mixture; wherein the derivatized polycarboxylate dispersant and the accelerator for concrete are both present in amounts effective in compatabilizing the pozzolanic cement replacement and the hydraulic cement and in accelerating the rate of hardening and setting; wherein the derivatized polycarboxylate dispersant comprises:

A) at least one of:
   i) a substituted carboxylic acid monomer; and
   ii) a substituted ethylenically unsaturated monomer;
B) at least one of:
   i) an N-polyoxyalkylene malemide; and
   ii) a condensation product of an unsubstituted carboxylic acid monomer and an alkoxypolyoxyalkylene primary amine substituted carboxylic acid monomer; and
C) optionally including an unsaturated hydrocarbon; and wherein the derivatized polycarboxylate dispersant comprises a polymer represented by a general structure of Formula I:

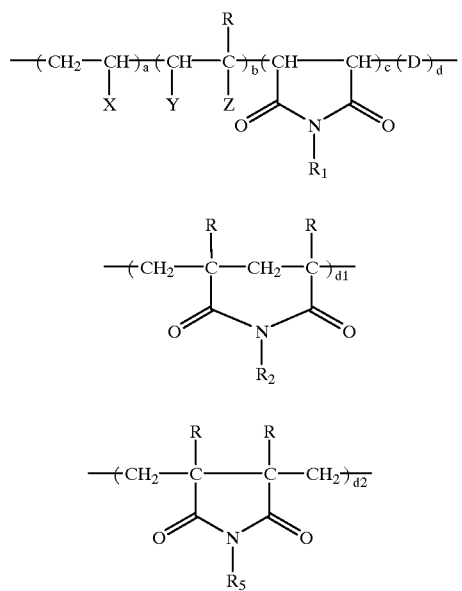

(Formula I)

Structure d1

Structure d2 wherein:
D=a component selected from the group consisting of the structure d1, the structure d2, and mixtures thereof;

X=H, $CH_3$, $C_2$ to $C_6$ Alkyl, Phenyl, Substituted Phenyl, Sulfonated Phenyl;

Y=H, —COOM;

R=H, $CH_3$;

Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;

$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;

$R_4$=H, Methyl, $C_2$ to $C_6$ Alkyl, $C_6$ to $C_{10}$ aryl;

M=H, Alkali Metal, Alkaline Earth Metal, Ammonia, Amine, Substituted Amine, Methyl, $C_2$ to $C_6$ Alkyl;

a=0 to about 0.8;

b=about 0.2 to about 0.99;

c=0 to about 0.5;

d=0 to about 0.5; and wherein a, b, c, and d represent the mole fraction of each unit and the sum of a, b, c, and d is 1.0, and wherein at least one of c and d is greater than 0; and wherein at least one of the following is present:
   i) M comprises triethanol amine; and
   ii) X comprises p-Methyl Phenyl.

17. The method of claim 16, wherein the general structure of Formula I is further characterized by at least one of: i) a is from 0 to about 0.6; ii) b is from 0.3 to about 0.99; iii) c is from 0 to about 0.3; and iv) d is from 0 to about 0.3.

18. The method of claim 16, wherein the general structure of Formula I is further characterized by at least one of: i) a is from 0 to about 0.5; ii) b is from 0.3 to about 0.99; iii) c is from 0 to about 0.1; and iv) d is from 0 to about 0.1.

* * * * *